US007568211B2

(12) United States Patent
Mai et al.

(10) Patent No.: US 7,568,211 B2
(45) Date of Patent: Jul. 28, 2009

(54) SYSTEM AND METHOD TO IMPLEMENT BUSINESS MODEL FOR ADVERTISING REVENUE BY DETECTING AND TRACKING AUDIENCE MEMBERS WHO VISIT ADVERTISER DESIGNATED LOCATIONS

(75) Inventors: John D. H. Mai, So. Pasadena, CA (US); Chun-Jung Wu, Hsinchu (TW); Pin-Chao Hsu, Hsinchu (TW); Bing-Chen Kuo, Hsinchu (TW); Bo-Chen Wu, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 610 days.

(21) Appl. No.: 11/274,284

(22) Filed: Nov. 16, 2005

(65) Prior Publication Data

US 2007/0113241 A1    May 17, 2007

(51) Int. Cl.
 *H04N 7/10* (2006.01)
 *G06F 3/00* (2006.01)
(52) U.S. Cl. .......................................... 725/35; 725/42
(58) Field of Classification Search .................. 725/35, 725/42
 See application file for complete search history.

(56) References Cited

U.S. PATENT DOCUMENTS

| | | | | |
|---|---|---|---|---|
| 6,912,398 | B1 * | 6/2005 | Domnitz | 455/461 |
| 2002/0174025 | A1 | 11/2002 | Hind et al. | |
| 2005/0093698 | A1 * | 5/2005 | Sakamoto et al. | 340/572.1 |
| 2006/0094411 | A1 * | 5/2006 | Dupont | 455/417 |
| 2007/0061328 | A1 * | 3/2007 | Ramer et al. | 707/10 |

FOREIGN PATENT DOCUMENTS

| | | |
|---|---|---|
| JP | 2001-134650 A | 5/2001 |
| JP | 2001-230996 A | 8/2001 |
| JP | 2002-148349 A | 5/2002 |
| JP | 2003-346052 A | 12/2003 |
| KR | 10-2003-0026446 A | 9/2001 |
| KR | 10-2005-0043236 A | 11/2003 |
| TW | 220952 B | 9/2004 |

\* cited by examiner

*Primary Examiner*—Christopher Kelley
*Assistant Examiner*—Franklin S Andramuno
(74) *Attorney, Agent, or Firm*—Birch, Stewart, Kolasch & Birch, LLP (57) ABSTRACT

The invention discloses a system and method to implement a business model for advertising revenue that allows advertising hosts to reliably detect registered audience members who respond to advertisements by coming into close physical proximity of designated locations, so that corresponding advertisers may be billed accordingly. A host system operated by the advertising hosts includes a data processing module, an electronic environment, advertisements, and a data communications network. The electronic environment presents content associated with that environment and the advertisements. Audience members who see the advertisements and respond by coming into close proximity to the designated locations associated with the advertisements are then detected by readers. An embodiment of the system and method utilizes RFID tags placed at the designated locations, and it utilizes RFID readers cared by audience members used to detect the tags when audience members come into close proximity of the tags.

22 Claims, 4 Drawing Sheets

FIG. 5

SYSTEM AND METHOD TO IMPLEMENT BUSINESS MODEL FOR ADVERTISING REVENUE BY DETECTING AND TRACKING AUDIENCE MEMBERS WHO VISIT ADVERTISER DESIGNATED LOCATIONS

FIELD OF THE INVENTION

This invention relates to a system and method to implement a business model for advertising, and, more particularly, to a business model for advertising that generates revenue for advertising host providers only after bringing audience members into close proximity of locations designated by advertisers.

BACKGROUND OF THE INVENTION

Traditionally, advertisers have had to rely on industry estimates in order to gage how many audience members had received their advertisements for products, services, and announcements. For example, in broadcast and cable television markets in the US, the A.C. Nielsen marketing and information company has generated estimates referred to as ratings of audience sizes for various markets using sampling methods involving random telephone polling and data gathering boxes strategically placed in viewers homes to monitor viewing activity.

One drawback to this method is that it involves sampling, and all sampling is subject to a certain degree of error. Ratings companies try to scientifically quantify the margin of error for their estimates, and, naturally, they strive to reduce it as much as possible in order for advertisers to have more confidence in their results and willingness to pay the advertising rates that are set according to those estimates. But there is always a degree of uncertainty in the results and the mathematical sciences of statistics and probability have limits in terms of quantifying human behavior.

Moreover, when it comes to advertising, there is no guarantee that viewers are attentively watching the advertising messages played during commercial breaks. Viewers often see commercial breaks as opportunities to take short intermissions to prepare food, make phone calls, and so on. Viewers are typically self-motivated to watch programs based on their personal interests, but there is little incentive for viewers to maintain their focus during commercials other than the entertainment or informational value provided by such commercials. Advertisers, on the other hand, are critically interested in ascertaining whether the advertisements that they have paid a significant sum to place are actually reaching their intended audience.

Print media advertising, such as found in magazines and newspapers, faces a similar dilemma. Advertising rates are typically based on subscription and/or circulation data, but there is still little assurance that readers have actually noticed the advertisements placed in such publications. Readers frequently page over advertisements unless they are specifically looking for something or something just happens to catch their eye. In any case, it is difficult for advertising companies to give any reliable data to advertisers about the number of people who have been impacted by the advertisements they have placed for advertisers. Such an advertising system is based on estimates, assumptions, and the hope that enough people will be impacted by the ads to make placing them worthwhile.

With the advent of the Internet, things have changed a bit. Although web pages still use traditional passive advertisements that attempt to get viewer attention through the use of pictures, typography, color, animation, video or sound, now it is possible to create advertisements that must be actively clicked on in order for viewers to receive further information. Viewers are first presented with preliminary advertisements to catch interest, similar to traditional advertising, except that it is not necessary for such preliminary advertisements to present much in the way of detailed information. Then, interested viewers seeking additional information must actively click on such advertisements to be directed to a subsequent advertisement with additional details. Such a willful click on the part of the viewer is considered a very strong indication of actual interest. Moreover, such willful clicks can be electronically counted in order to measure the effectiveness of such advertising and to bill advertisers accordingly. Through this way, advertisers can have increased confidence that their advertisements were effectively noticed. It is even possible to target specific users matching particular profiles. Such targeting has limits, but works to a degree.

As an example of this technique, U.S. Pat. No. 5,948,061, granted to an advertising company, discloses a system and method for delivering customized advertisements through interactive communications systems such as the Internet. In this technique, advertisers contract with advertising companies to place advertisements in interactive environments that allow viewer responses such as web pages. Such advertisements may or may not be specifically targeted at particular viewers. Either way, viewers must actively click on such advertisements, and the act of clicking can be counted. Advertising companies then bill advertisers according to the number of clicks for various advertisements in order to generate revenue.

There is little doubt that this method of advertising represents a difference in kind rather than just degree from traditional advertising methods. The ability to allow viewers to actively register their interest by clicking dramatically improves on the confidence that advertisers can have in the effectiveness of their advertisements. However, this method is not without its drawbacks. In some ways, the simple act of clicking may be too simple of a response mechanism to state with a high degree of certainty that viewers are definitely interested in the advertisements to which they are directed after clicking. Viewers may be just casually perusing advertisements and not especially interested at the point of clicking. Moreover, counting clicks on advertisements doesn't effectively gage viewer attention after viewers are redirected to subsequent advertisements. Viewers may ignore or minimally attend to such advertisements after they are presented. Lastly, for whatever reasons, the same viewers may click on the same advertisements multiple times, but such events would likely be counted as separate viewer impressions.

Recognizing the drawback that viewers may minimally notice advertisements, U.S. Pat. No. 6,335,744 details a technique for conducting a game over a communications network, wherein users are rewarded for visiting advertisements for lengthier periods of time. The technique involves first attracting a player to a participating advertiser's website to procure a virtual token placed on that website. However, such tokens may only be acquired during certain periods of time as identified by the color of the token or some other identifying characteristic. Having already made the effort to visit a participating website, a player is likely to wait until a token becomes available if it is not presently in the acquisition state, and, during such time, the player may more completely read or take notice of the advertisement with which the token is associated. Later, when the token switches to the acquisition state, the player may acquire it and return to the game to receive credit for visiting the website.

This technique attempts to address a problem inherent with most forms of advertising: viewers often ignore unsolicited advertisements. Much like the old adage about horses and water, "Advertisers may lead viewers to their advertisements but they can't make them think." Although advertisers may expose viewers to advertisements within a certain advertising medium, it is often difficult to get viewers to specifically pay attention to the details of the advertisements, such that meaningful viewer impressions are realized. Part of the equation measuring the impressions that advertisements have made involves the time that has been spent viewing the advertisements. The preceding invention attempts to increase the viewing time by rewarding players that spend additional time at participating websites. So, this technique likely increases the number of meaningful viewer impressions—as opposed to just clicks—because it increases the time spent viewing advertisements. However, audience members may still ignore or only partially attend to the advertisements. They might even view other websites while waiting for tokens to become available.

Naturally, one way to increase the certainty of viewer interest would be to delay counting viewer impressions until viewers had actually made online purchases or otherwise significantly responded, such as by registering personal information of some sort. While feasible and useful to a point, few advertising companies would want to be restricted solely to this method of revenue generation. Such advertising would be limited to situations where immediate purchases or commitments were desired. However, a large percentage of advertisers don't need or demand immediate responses, as long as they feel that their messages are sufficiently impacting viewers such that they can expect viewer responses in the future. What is needed is a way for viewers to actively express interest that is somewhere in the gap between viewers merely noticing advertisements and the end-goal of making purchases or other commitments.

SUMMARY OF THE INVENTION

To address advertiser concerns about the efficacy of the advertisements they place with advertising hosts, an objective of the present invention is to provide a system and method to allow registered audience members to actively indicate their interest in advertisements to which they have been exposed by coming into close proximity with designated locations associated with the advertisements and being detected while in close proximity such that advertisers may billed accordingly. The system and method involves first exposing registered audience members to advertisements by advertisers through an advertising host system. Then, interested audience members actively respond to the advertisements by seeking out designated locations associated with the advertisements and coming into close proximity of those designated locations. At that time, detectors, such as readers carried by the audience members, detect that audience members are in close proximity of the designated locations by reading identity information associated with the designated locations. Such detection may be carried out automatically or may be purposefully initiated by audience members, such as by pressing a button. Each distinct read event for a specific audience member within a particular time period is considered a transaction involving the participating audience member, the advertising host, and the associate advertiser. Subsequently, transactions for each audience member are uploaded to the host system, either individually or in bulk. Such transactions can then be tracked and aggregated in order for the advertising host to generate revenue by billing advertisers accordingly. The advertising host may then compensate participating audience members in order to give them an incentive to respond to advertisements on the advertising host system.

Such a system provides increased benefits to advertisers, advertising hosts, and audience members. Advertisers benefit because they can have a high degree of assurance that the transactions for which they are billed represent interested audience members that have not only seen their advertisements but also responded by coming into close proximity of designated locations associated with those advertisements. Such designated locations might be actual products, places providing products or services, points of display of information about such products or services, or simply locations that advertisers are interested in having audience members visit. Such proximity is advantageous to advertisers in that it either gives audience members opportunities to see actual products and services, or it allows them to learn more about the products, services, or events associated with such designated locations. Such audience members are more likely to purchase such products and services, or to take part in events at the designated locations. Advertising hosts benefit because they have an advertising service that they can offer to advertisers that doesn't rely on estimates in order to gauge the efficacy of advertisements. And audience members benefit because they can receive compensation from advertising hosts for responding to advertisements by coming into close proximity of designated locations associated with those advertisements. Such proximity may also give audience members more opportunity to learn about products, services, and events than might otherwise happen.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENT

The present invention is described in the following with a specific embodiment, so that one skilled in the pertinent art can easily understand other advantages and effects of the present invention from the disclosure of the invention. The present invention may also be implemented and applied according to other embodiments, and the details may be modified based on different views and applications without departing from the spirit of the invention.

Figure 1:
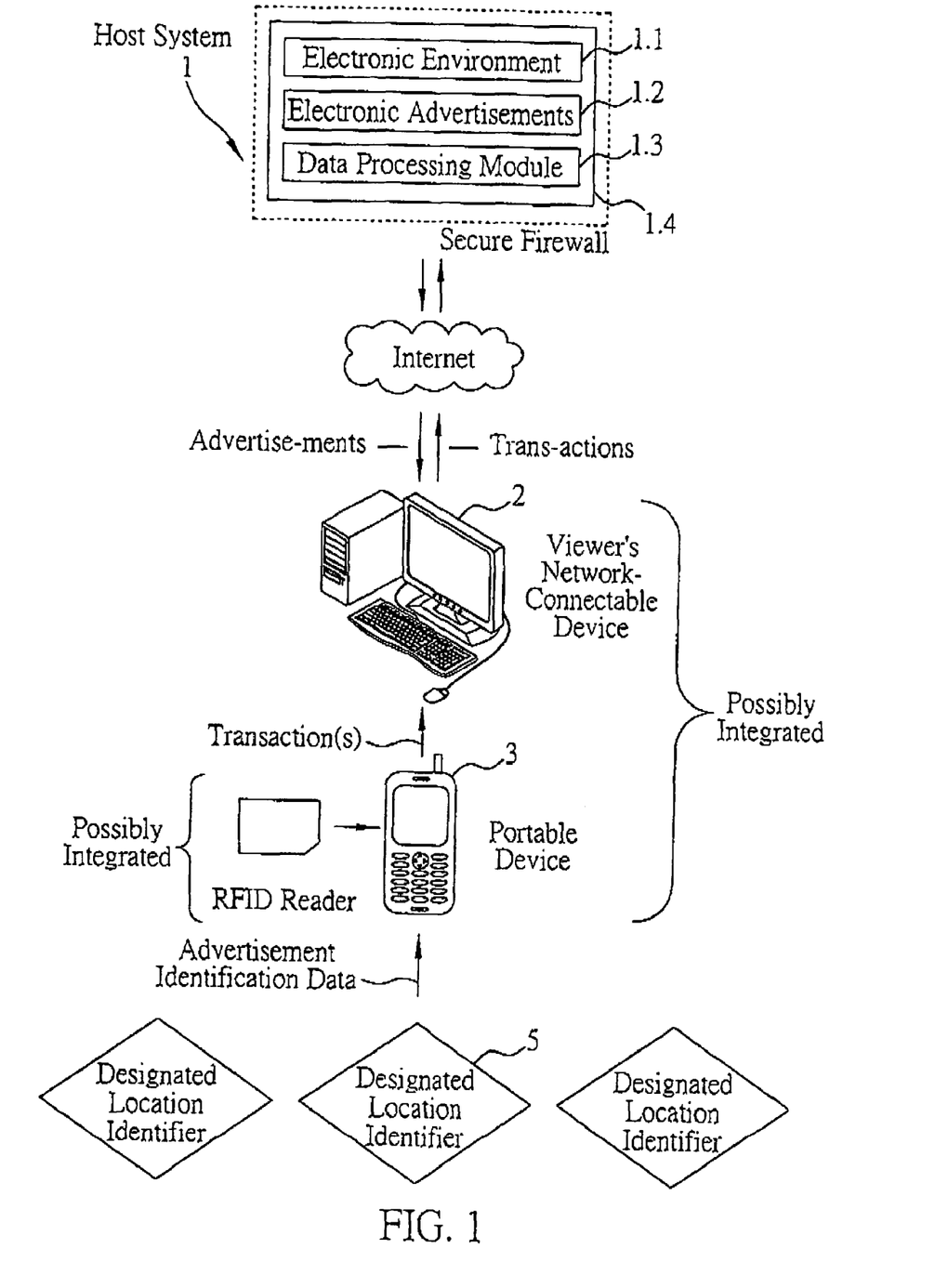
FIG. 1 is a general system diagram of the components of a preferred embodiment of the invention, including a host system, location identifiers, and audience member devices used to read the identity tags and communicate with the host system.

FIG. 1 is an overall structural diagram of the components of a preferred embodiment of the system to detect audience members who visit advertiser-designated locations in the advertising model according to the present invention. The system comprises a host advertising system 1, network-connected devices 2, portable devices 3, readers 4, and designated locations marked by location identifiers 5.

The host system 1 comprises an electronic environment 1.1 to provide content associated with the electronic environment, advertisements 1.2 from advertisers (not shown) associated with the designated locations having location identifiers 5, a data processing module 1.3 to track information about the advertisements 1.2 and audience members (not shown) that respond to the advertisements 1.2 by coming into close proximity with the designated locations marked by location identifiers, and a secure firewall 1.4 between the host components and the Internet to allow secure data communications with audience members using network connectable devices 2 connected to the Internet.

The aforementioned electronic environment provides content to audience members that is presented on the network-connectable devices 2. Examples of such content include: online games, such as role-playing games that allows multiple players to compete from separate locations; online communities, such as social networks interlinking community members; information-providing services, such as online educational class services, and data dissemination services, such as downloading services providing content such a pictures, music, videos, or software. Audience members may subscribe to such content for a fee, or it may be provided at no cost.

The host system provider may then in turn provide compensation to audience members who respond to advertisements by coming into close proximity of the advertisements. Such compensation could be monetary, or it could take the form of prizes or services, or compensation could have virtual value, such as points or virtual items that have value in the context of the electronic environment. For example, a player in a role-playing game could be compensated for responding to advertisements in the real world by being awarded a defensive shield having value in the virtual world. Moreover, players could have the option of exchanging such compensation. Ability to exchange items of compensation would increase the value of such compensation by giving audience members more flexible use of such compensation. The exchange of such items could be managed by a Virtual Electronic Exchange System (VEES). The VEES system would be a part of the electronic environment 1.1, and it could interact with the data processing module tracking advertisements and audience member responses in order to compensate audience members who visit designated locations.

The designated locations marked by location identifiers 5 can be actual products, places providing products or services, points of display of information about such products or services, or simply locations that advertisers are interested in having audience members visit. Generally speaking, the designated locations are chosen by advertisers, but merchandisers or other decision makers may influence the actual physical placement of the location identifiers 5. Examples of such designated locations marked with location identifiers 5 include: a refrigerator, wherein the location identifier 5 is on the actual product; a doorway of a merchandiser, wherein the merchandiser offers a multitude of products; a hair salon, wherein the location identifier 5 is in close proximity to the location where hair services are performed; a point-of-sale sign advertising chewing gum in a convenience store, wherein the location identifier 5 is in close proximity to chewing gum products sold by the advertiser that designated the location and sponsored the point-of-sale sign; or a blood donation center, wherein the center offers no products or services for sale but wishes to attract visitors to a location marked by a location identifier 5 in order for the visitors to learn more about center's operation and purpose. The physical setup of the designated locations marked by location identifiers 5 can, in principle, be provided by the advertisers, host system providers, or merchandisers. Generally speaking, such physical setup would be handled by merchandisers.

Audience members access the content of the electronic environment 1.1 and the advertisements 1.2 using network-connected devices 2 such as desktop and notebook PCs. For the most part, interest in the content provided by the electronic environment motivates audience members to access the content, but audience members may have interest in the advertisements, as well. In the system and method of the present invention, audience members can receive compensation from host system providers if they verifiably visit designated locations marked with location identifiers 5 associated with the advertisements 1.2. Such verification can be facilitated by having audience members travel with readers 4 capable of detecting when the audience members come into close proximity of the location identifiers 5. Such detection may be done automatically by having the location identifiers 5 initiate detection or by having the reader 4 use a polling technique to periodically sense the environment. Alternately, such detection may be done manually, such as by the audience member pressing a button on the reader device.

In order for the system to compensate individual audience members for responding to advertisements by coming into close proximity of the location identifiers 5 associated with those advertisements, audience members must register with the host system provider. Registration is accomplished by associating a serial number in the reader 4 with an account for the audience member stored in the data processing module 1.3. In this way, responses to advertisements 1.2 by audience members can be tracked—or at least counted—in order to compensate audience members for responding to advertising in such a pronounced way. Use of serial numbers also enhances the security of the system.

The reader 4 may be a stand-alone device having its own power source and processing capability. Alternately, the reader may be a separate or modular device that works in conjunction with a portable device 3, such as a cell phone or a PDA, in order to reduce the cost, complexity, or size of the reader. That is the design approach taken in the preferred embodiment. Such a reader 4 or portable device 3 used in combination with a reader 4 can then be synchronized with a network-connectable device 2, such as a desktop or notebook PC. It is also conceivable that the reader 4 or a portable device 3 working in combination with the reader 4 may have built-in networking capability, such as Wi-Fi or GPRS, such that it might be possible to upload transaction data without synchronizing with a network-connected device 2. If such network connectivity is present and utilized, it is also possible that the portable device 3 could present real-time content from the electronic environment and advertisements that are associated with location identifiers. Therefore, in the latter case, a single portable device 3 could present content from the electronic environment 1.1 and the advertisements 1.2, read location identifiers 5 using an integrated or modular reader 4, and subsequently upload transaction data to the data processing module 1.3. However, such an integrated device is not a requirement of the invention.

At the time that a responding audience member is detected to have come into proximity of a designated location marked with a location identifier 5, a transaction code is generated to represent the completed transaction involving the audience member, the advertiser, and the host system provider. The transaction code is an aggregation of several data items: the identity of the location identifier 5, which is read from the identifier; the physical location of the location identifier 5 (if available), which is also read from the identifier, the serial number of the reader 4, which was registered to the audience member using the device; a time stamp of transaction event representing the time that the transaction occurred, which may be read in various ways, such as from the system into which the reader is installed; and an optional checksum, which is subsequently used to ensure the reliability of the transmission of the transaction code. Additionally, the transaction code may be encrypted in order to enhance the protection and privacy of the data represented therein.

After one or more transaction codes have been generated for a particular audience member, the transaction codes may be uploaded to the data processing module 1.3 of the host system 1 in order for the host provider to track audience members response activity so that the audience member may be compensated and so that advertisers way be billed appropriately based on the number of responses to their advertisements. Transaction codes could be individually uploaded shortly after generation if network access were available. More typically, transaction codes would be sequentially stored in the portable device 3 as they came in and subsequently uploaded in bulk when network access was available.

Figure 2:
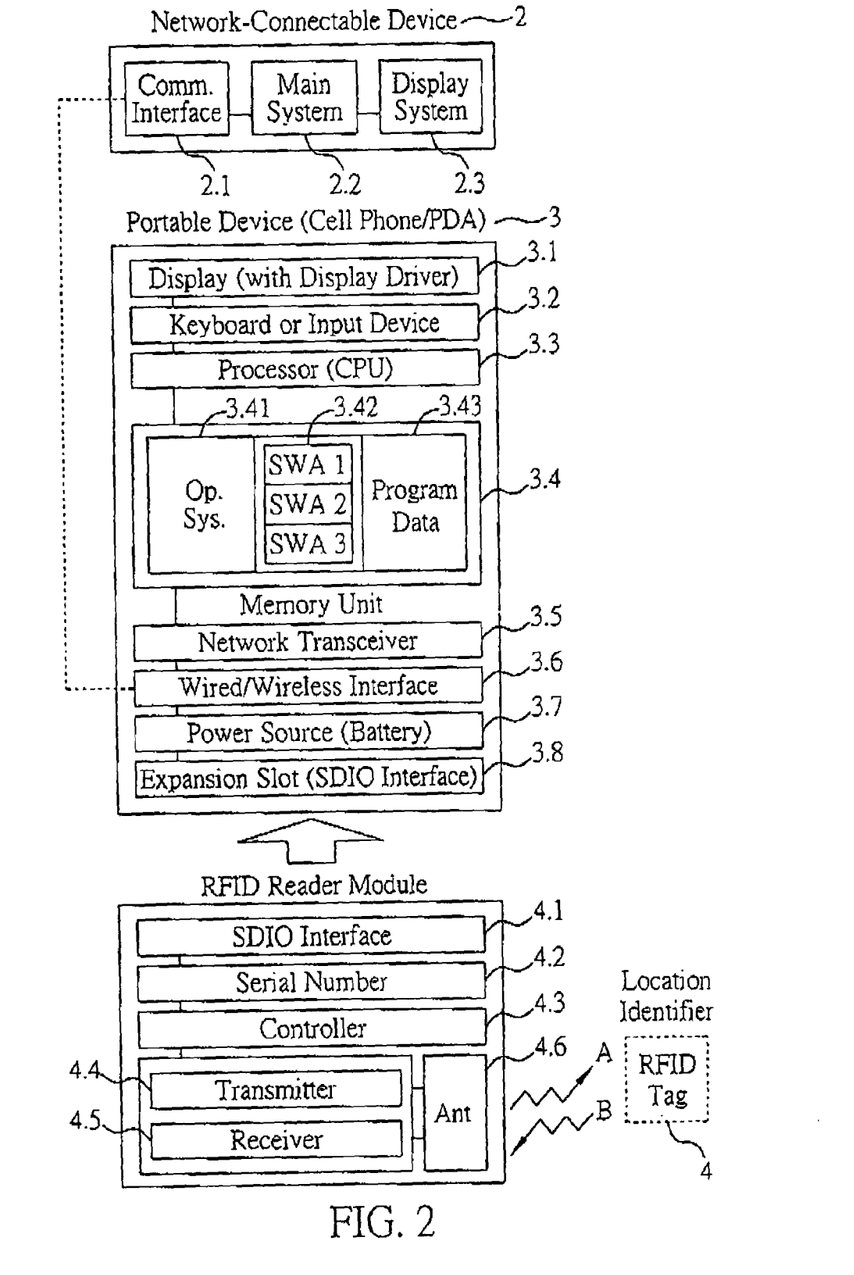
FIG. 2 is a detailed block diagram of the portion of the system showing the reader and portable device of FIG. 1, wherein the reader and location identifiers use radio frequency identification (RFID) technology.
Figure 3:
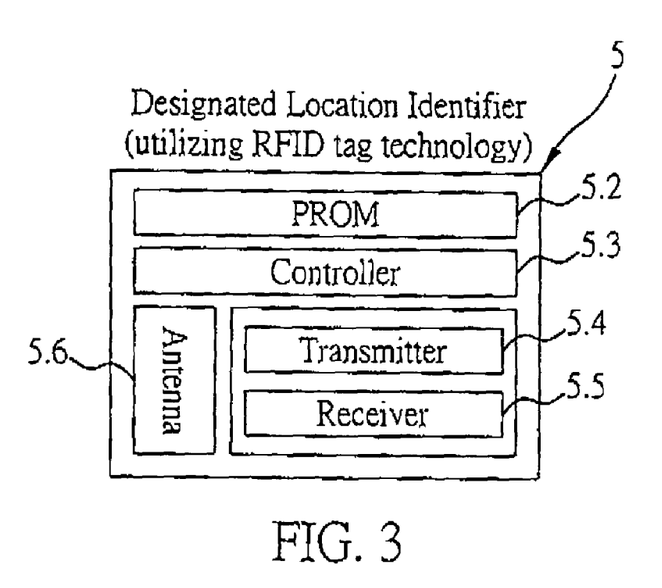
FIG. 3 is a detailed block diagram of a single location identifier of FIG. 1, wherein the location identifier uses radio frequency identification (RFID) technology.
Figure 4:
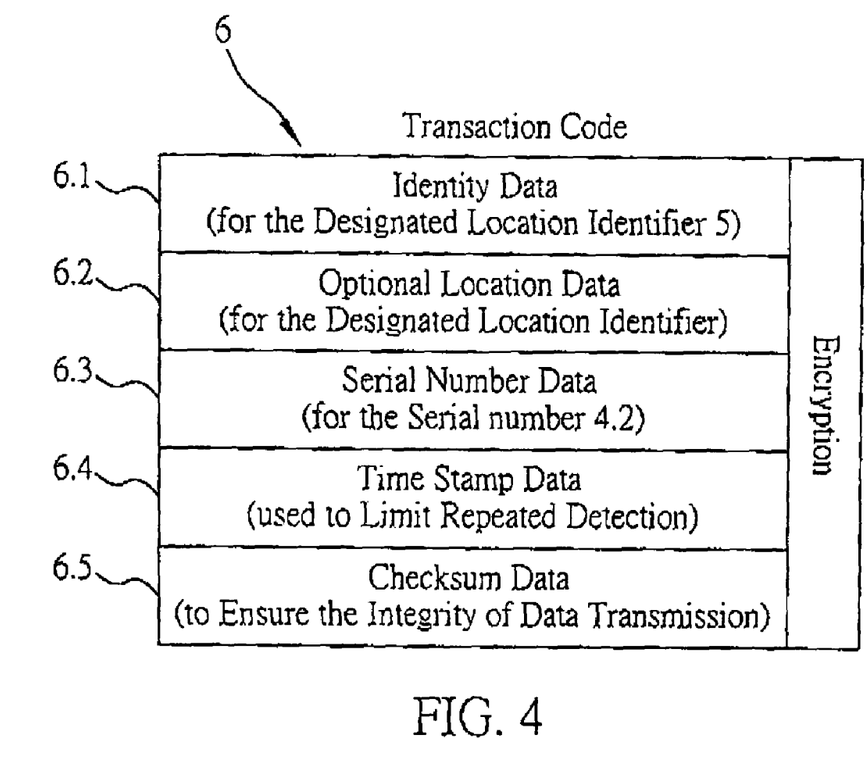
FIG. 4 is a block diagram illustrating the data components of the basic transaction code format used by the invention.

FIG. 2, FIG. 3, and FIG. 4, with reference to FIG. 1, further detail the preferred embodiment of the present invention. FIG. 2 depicts a reader 4 used in conjunction with a portable device 3. FIG. 3 depicts a location identifier 5 that communicates with the reader 4 of FIG. 2. FIG. 4 depicts the basic composition of transaction codes that result from the use of the reader 4 in conjunction with a portable device 3 to read a location identifier 5.

Referring to FIG. 2, the reader 4 is a modular SDIO card utilizing radio frequency identification (RFID) technology to read corresponding RFID tags used as location identifiers 5. In this embodiment, the reader 4 is a modular SDIO card designed to interface with the SDIO port of a portable device 3 such as a cellular phone or a PDA. The advantage to this design is that the cost, complexity, and size of the reader 4 can be reduced because the reader 4 can utilize the processor, memory, keyboard, display, and power source of the portable device 3, and the reader 4 can take advantage of a portable device 3 that audience members are likely already carrying, dispensing with the need to carry a second device.

The reader 4 comprises: an SDIO interface 4.1 for providing SDIO connectivity; a serial number 4.2 stored in a non-volatile memory register, the serial number being associated with a particular audience member carrying the reader; a controller 4.3 to communicate with the portable device 3 and to control overall functionality of the reader 4; a transmitter 4.4 to either generate RFID data signals to communicate with location identifiers 5 (RFID tags) or power waves to power the location identifiers 5 (RID tags); a receiver 4.5 to receive data from location identifiers 5 (RFID tags), with such data comprising information about the advertisement associated with the location identifier 5 and the indicated and presumed valid location of the tag, if available; and an antenna 4.6 for transmitting signals from the transmitter 4.4 to the location identifier 5, and for receiving signals from the location identifiers 5 in order to pass the signals on to the receiver 4.5 for demodulation. Both the SDIO interface standard and RFID technology are well defined in the art and are not otherwise further detailed herein.

The portable device, such as a cell phone or PDA, comprises: a display (with display driver) 3.1 for presenting status information or other information; a keyboard or input device 3.2 to accept input; a processor 3.3 to control the operation of the portable device 3, a memory unit 3.4 for storing the operating system 3.41, software applications 3.42, and program data 3.43; a network transceiver 3.5, which is required for a cell phone and optional in the case of a FDA; a wired/wireless interface 3.6 for synchronizing the portable device 3 with a network-connectable device 2, such as desktop or notebook PC, wherein the interface may be a proprietary connection or a standardized connection such as USB or Bluetooth; a power source 3.7, typically provided by a battery; and an expansion slot 3.8 conforming to the requirements of the SDIO interface specification.

To utilize such a design comprising a reader 4 installed in a portable device 3, the audience member first registers the reader 4 by synchronizing the portable device 3 with a network-connectable device 2 connected to the data processing module 1.3 of the host system 1. A small software application and/or driver is installed into software application memory space 3.42 of the memory unit 3.4 of the portable device 3, in order for the portable device 3 to be able to communicate with the reader 4. Afterwards, the reader 4 may work in conjunction with the display 3.1, keyboard 3.2, processor 3.3, memory unit 3.4, network transceiver 3.5 (if available and desired), wired/wireless interface 3.6, power source 3.7, and expansion slot 3.8 of the portable device 3. By this design, audience members can inexpensively augment the functionality of their portable devices.

FIG. 3 shows a simplified block diagram of a location identifier 5 (RFID tag) used to communicate associated advertisement data stored in the location identifier 5. Detailed components such as modulator/demodulator blocks and an antenna switch are not shown because they are somewhat variable in application and are a part of the existing art. The basic structure comprises: non-volatile data storage in a PROM 5.2 (ROM/PROM/EEPROM), used to store data associated with the advertisements and/or products being advertised, optionally including the location of the products; a controller 5.3 for controlling the operation of the location identifier 5 upon activation; a receiver 5.5, used to receive data from the reader 4, such as any authorization data to gain access to the tag, and, in the case of a passively powered tag, power to power the tag while it is being read; a transmitter 5.4 to transmit the data stored in the PROM; and an antenna 5.5 to receive data signals or power waves from the reader 4 and to send data from the location identifier 5 to the reader 4. Although the FROM may be programmable, the present invention does not need to write any data to the tag in order to accomplish the system and method of the invention. Such data is written in advance per the requirements of the advertiser or producer of the product (or service). It is, however, necessary to associate such data with the advertisement 1.2 such that tracking may be provided by the data processing module 1.3.

The portable device 3, reader 4, and the location identifier 5 implemented with RFID tag technology work together to complete a transaction when a registered audience member comes into close proximity of a location identifier 5 while in possession of the reader 4 installed in a portable device 3. The reader 4 first sends out a transmission (A) using its transmitter 4.4 and its antenna 4.6, in order to activate the location identifier 5. This transmission may be automatically initiated by the reader or audience-member initiated by the audience member, such as by pressing a button. The transmission may include authorization data to request access to the data of the location identifier 5 (RFD tag), if required, and may involve electromagnetic energy to power the circuitry of the location identifier in the case that it is passively powered. The location identifier 5 uses its antenna 5.6 to capture a portion of the electromagnetic energy of the transmission (A) and its receiver 5.5 to process the transmission. The location identifier 5 will then respond by sending a transmission (B) to the reader 4 using its transmitter 5.4 and its antenna 5.6 to send part or all of the data stored in its non-volatile PROM 5.2. The reader 4 will then use its antenna 4.6 and receiver 4.5 to capture and process the transmission (B) from the location identifier 5. The data received by the reader 4 will then be passed on to the software application running in the software application memory area 3.42 of the memory unit 3.4 of the portable device 3 for further processing in order to form a transaction code as previously discussed. The transaction code is then stored for subsequent uploading to the data processing module 1.3 of the host system 1.

FIG. 4 illustrates at a glance the basic composition of a transaction code 6 as an aid to understanding. The figure provides only a representation of the data elements that compose the transaction code 6, rather than a detailed representation showing the actual bit structure in application. Note that transaction codes 6 are logical elements and have no permanent physical existence, other than the memory elements in which they temporarily exist. Referring to FIG. 4, a transaction code 6 is composed of: identity data 6.1, corresponding to the identity of the location identifier 5, used to identify the location identifier, optional location data 6.2, corresponding to the location of the location identifier 5, if available, used to identify the presumed location of the location identifier 5; serial number data 6.3, corresponding to the serial number 4.2 of the reader 4, used to associate an audience member with a particular reader 4; time stamp data 6.4, corresponding to the time that the transaction occurred as provided, for example, by the portable device 3, used to both restrict additional detection of the same location identifier 5 by the same reader 4 within a prescribed period of time and to better document the transaction process for control purposes; and checksum data 6.5, calculated by the software application running in the software application memory area 3.42 of the memory unit 3.4 of the portable device 3, used to ensure the reliability of subsequent transmission of the transaction code.

The purpose of the transaction codes 6 is to allow the host system provider to reliably track the number of times that advertisements have received responses involving audience members visiting the designated locations associated with such advertisements. Such tracking allows host system providers to charge advertisers accordingly based on the number of responses to the advertisements. In such a system, there is no need to rely on estimates; host system providers would charge advertisers for exactly the number of responses that were made to their advertisements. Such tracking would provide the basis or proof for such charges. Each advertisement would be tracked individually, and the charge would be based on the total number of times audience members visited the designated location or locations associated with that advertisement. However, a transaction log could be maintained which would show the time, place, and, possibly, the participating audience member associated with each transaction, in order to provide additional basis for the corresponding charge. Such a log could be randomly audited on occasion and would allow for more accountability in the advertising system.

Another purpose of the transaction codes 6 is to provide a measure of security against abuse by audience members. For example, it would desirable to have the ability to limit the number of times an audience member could visit (scan) the same location identifier 5 within a preset period of time in order to prevent repeated scanning just to acquire additional compensation without any additional exposure to the information associated with the designated location. Such a limit could be imposed through use of the time stamp 6.4 portion of the transaction code 6. Having a limit would also discourage audience members from removing location identifiers 5 marking the designated locations and taking them to other locations where they could be scanned more conveniently.

Figure 5:
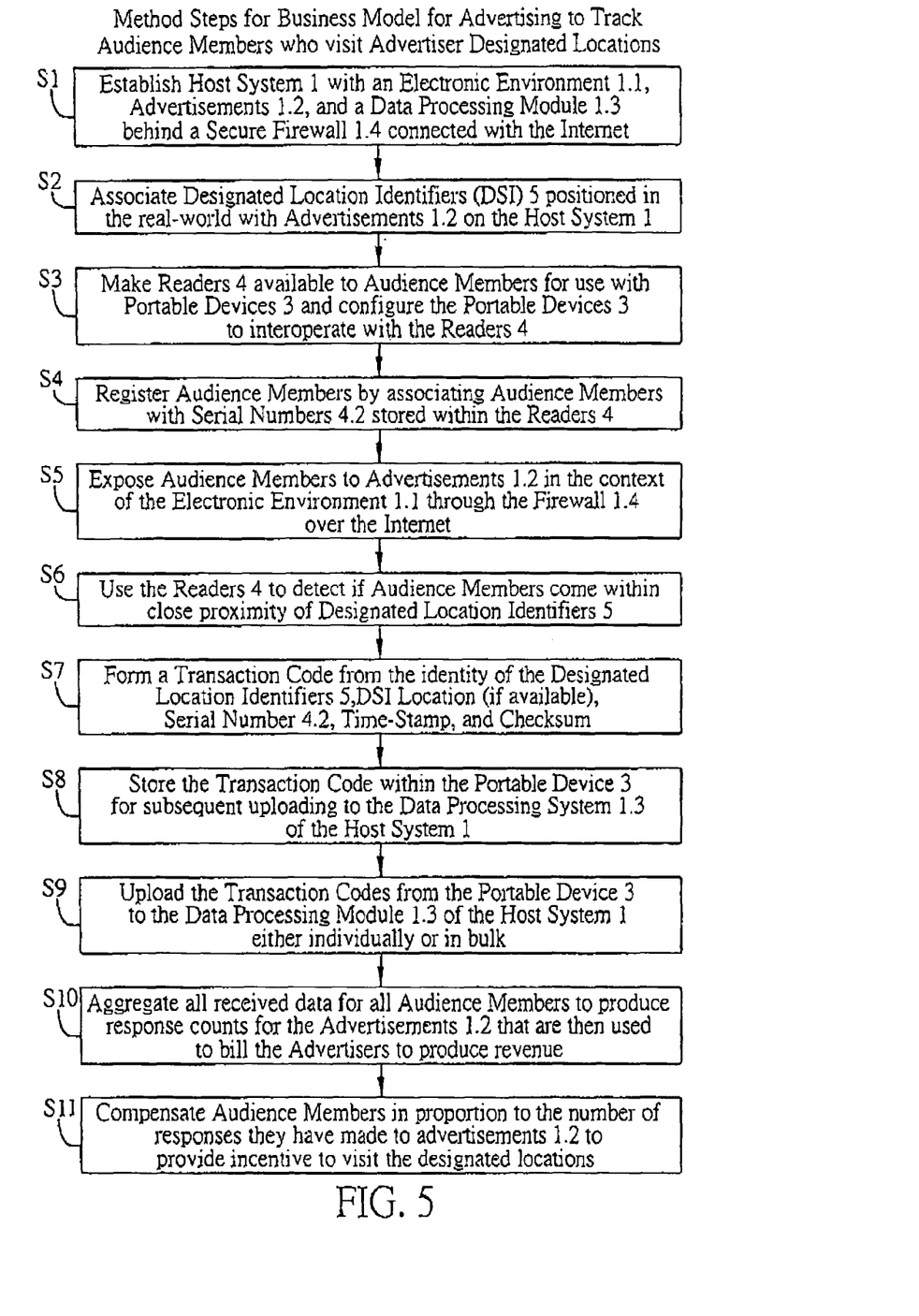
FIG. 5 is a flowchart of the series of steps required to carry out the method of the invention.

FIG. 5 details the steps necessary to carry out the objective of the invention. The method of the invention to track audience member visits to designated locations involves the following series of events; first, in step S1, a host system 1 is provided comprising an electronic environment 1.1, advertisements 1.2, a data processing module 1.3, and a secure firewall 1.4 connecting the host with the Internet; second, in step S2, location identifiers 5 are associated with the advertisements 1.2, wherein said location identifiers 5 are deployed in designated locations in the real world; third, in step S3, readers 4 are made available to audience members to be used in conjunction with portable devices 3 which are configured to work with the readers 4 by installing software so as to facilitate reading of the location identifiers 5 in the real world; fourth, in step S4, readers 4 are registered to audience members by associating serial numbers 4.2 stored in the readers 4 with accounts for the audience members tracked in the data processing module 1.3; fifth, in step S5, audience members are exposed to advertisements 1.2 in the context of the electronic environment 1.1 via the secure firewall 1.4 connecting the host to the Internet such that the advertisements 1.2 are displayed on network-connectable devices 2 connected to the Internet; sixth, in step S6, audience members move into close proximity of location identifiers 5, at which time either automated, device-initiated or manual, user-initiated readings occur, wherein data communication takes place between the reader 4 and the location identifier 5 to transfer data from the location identifier 5 to the reader 4; seventh, in step S7, transaction codes 6 are formed to represent completed transactions involving the audience members, advertisers, and host system providers; eighth, in step S8, generated transaction codes 6 and stored in the memory unit 3.3 of the personal devices 3; ninth, in step S9, transaction codes 6 stored in the memory unit 3.3 of the personal device 3 are uploaded to the data processing module 1.3 by synchronizing the personal device 3 with a network connectable device 2 connected to the Internet; and, tenth, in step S10, transaction code data is aggregated for all audience members to produce response counts for the advertisements 1.2 so that advertisers can be billed based on the actual number of times their advertisements have been responded to in order to generate revenue for host system providers; and, lastly, in step S11, audience members are compensated by host system providers in proportion to the number of transactions involving them in order to provide incentive for the audience members to visit the designated locations marked with location identifiers 5 associated with the advertisements 1.2.

The forgoing represents a preferred embodiment of the invention to illustrate features of the invention in practical application. Other embodiments are possible. For example, the reader 4 could be a standalone unit having its own power source and processing ability. Such a reader could communicate with either a portable device 3 or a network connectable device 2. Alternately, it is possible for the reader 4 to be integrated into the portable device 3, as opposed to being a modular card or a standalone device. In addition, as previously mentioned, it is possible for the portable device 3 to be the same device that presents content from the electronic environment 1.1 and the advertisements 1.2. In such a case, an audience member could use the same device to access virtual content in the electronic environment 1.1 and read location identifiers 5 in the real world environment.

Although the foregoing embodiment was chosen and described in order to best explain the principles of the invention and its practical application, it is not intended to limit the scope of the present invention, but rather to enable others skilled in the art to best understand and utilize the invention with various modifications as are suited to the particular use contemplated. The scope of the invention is defined by the following claims and their equivalents.

What is claimed is:

1. A system to implement a business model for advertising revenue that allows advertising hosts to reliably detect registered audience members who respond to advertisements by coming into close physical proximity of designated locations, so that corresponding advertisers are capable of being billed accordingly, the system comprising:

identifiers placed at designated locations in the real-world associated with advertisements from advertisers, wherein the identifiers contain information to identify the advertisements with which they are associated and comprise radio frequency identification (RFID) tags encoded with identifying information for the advertisements associated with those identifiers, using either active or passive radio transmission, such that the tags can be remotely sensed electromagnetically within a certain range by an RFID reader;

an electronic environment that is capable of presenting advertisements that are associated with the designated locations;

advertisements associated with the designated locations presented in the electronic environment;

a data processing module to track information related to the advertisements and the registered audience members who respond to such advertisements;

data processing devices used by the registered audience members capable of receiving and presenting information and advertisements from the electronic environment and uploading transaction and registration information generated by the registered audience members;

a data communications network to intercommunicate between the data processing module, electronic environment, electronic advertisements, and data processing devices; and detectors for physically detecting the presence of the registered audience members who come into close proximity of the designated locations, wherein such detectors are capable of being uniquely associated with the registered audience members via serial numbers contained within the detectors or by unique identifying features of the registered audience members themselves, are capable of being integrated with the data processing devices, distinct from the data processing devices but cooperating with them, or entirely separate from the data processing devices but capable of communicating with the data communications network, and comprise radio frequency identification (RFID) readers having radio frequency transceivers carried by responding audience members coming into close proximity of the designated locations, wherein the radio transceiver portion of the RFID readers, including the antenna and an embedded, unique serial number, is implemented in a modular card selected from the group consisting of an SDIO and Mini SDIO, wherein a single transaction is defined to occur in the event of a registered audience member coming into proximity of a single designated location and being detected by a detector, and wherein, after a detector detects the identity of a particular identifier, and, optionally, ascertains its location, the identity is then aggregated with the location, if available, time of transaction, serial number from the detector, and an optional checksum into a transaction code that is then optionally encrypted prior to subsequent uploading to the advertising host.

2. A method to implement a business model for advertising revenue that allows advertising hosts to reliably detect registered audience members who respond to advertisements by coming into close physical proximity of designated locations, so that corresponding advertisers are capable of being billed accordingly, the method comprising the steps of:

establishing identifiers at designated locations in the real-world that are associated with advertisements, wherein the identifiers contain information to identify the advertisements with which they are associated, and the identifiers for the designated locations comprise radio frequency identification (RFID) tags encoded with identifying information for the advertisements associated with those identifiers, using either active or passive radio transmission, such that the tags can be remotely sensed electromagnetically within a certain range by an RFID reader;

establishing a data processing module to track information related to the advertisements and to track transaction data generated as a result of registered audience members coming into close proximity of the designated locations;

establishing an electronic environment capable of registering audience members, presenting content related to the electronic environment, and presenting advertisements to audience members;

creating advertisements associated with the designated locations and making the advertisements available to the electronic environment;

connecting the data processing module, electronic environment, and advertisements through a network and making the network accessible to audience members via Internet;

registering audience members by associating either serial numbers of devices utilized by audience members or identifying characteristics of audience members with audience member accounts;

transmitting advertisements to network-connected devices utilized by audience members and presenting the advertisements to the registered audience members;

detecting when the registered users come within close proximity of the designated locations by using detectors to read the identities of the designated locations, wherein the detectors are capable of being integrated with the data processing devices, distinct from the data processing devices but cooperating with them, or entirely separate from the data processing devices but capable of communicating with the data communications network, and the detectors comprise radio frequency identification (RFID) readers having radio frequency transceivers carried by responding audience members coming into close proximity of the designated locations, wherein the REID readers are implemented in portable devices selected from the group consisting of cellular phones, PDAs, and combinations thereof carried by responding audience members, wherein the REID readers implemented in portable devices are capable of utilizing the power source, display, memory, processor, software, or operating system of the portable devices in order to reduce the required elements and cost of the REID readers, and wherein the radio transceiver portion of the REID readers, including the antenna and an embedded, unique serial number, is implemented in a modular card selected from the groups consisting of an SDIO and Mini SDIO; and forming a transaction code each time an audience member comes into proximity of a designated location by aggregating the identity of the designated location, the location of the designated location, if available, the serial number or identifying characteristic associated with the audience member, the time, and a possible checksum, and then optionally encrypting the transaction code; and communicating the transaction codes generated by each audience member to the data processing module, either individually or in bulk, wherein a single transaction is defined to occur in the event of a registered audience member coming into proximity of a single designated location and being detected by a detector, and wherein, after a detector detects the identity of a particular identifier, and, optionally, ascertains its location, the identity is then aggregated with the location, if available, time of transaction, serial number from the detector, and an optional checksum into a transaction code that is then optionally encrypted prior to subsequent the uploadmnn to the advertising host.

3. The method to implement a business model for advertising revenue of claim 2, wherein said designated locations refer to actual products, places providing products or services, points of display of information about such products or services, or simply locations that advertisers are interested in having audience members visit.

4. The method to implement a business model for advertising revenue of claim 2, wherein transactions are automatically initiated by the identifiers, detectors, or audience member initiated by an audience member pressing a button.

5. The method to implement a business model for advertising revenue of claim 4, wherein advertising hosts generate revenue by charging advertisers based on the number of completed transactions involving registered audience members coming into close proximity of designated locations and being detected by detectors.

6. The method to implement a business model for advertising revenue of claim 2, wherein the system can be operated by advertising hosts to provide compensation to responding audience members, such that real-world responses to advertisements by responding audience members who come into close proximity with designated locations are capable of acquiring value.

7. The method to implement a business model for advertising revenue of claim 6, wherein said compensation can have monetary value, redemptive value for prizes or services, or virtual value in the context of the electronic environment.

8. The method to implement a business model for advertising revenue of claim 7, wherein the electronic environment further comprises a Virtual Electronic Exchange System (VEES) to enable audience members to exchange received compensation with other audience members.

9. The method to implement a business model for advertising revenue of claim 2, wherein the electronic environment is a game, a community of interacting participants, an information providing service, or a data dissemination service.

10. The method to implement a business model for advertising revenue of claim 2, wherein the data communications network comprises the Internet and Internet-connected or Internet-connectable devices selected form the groups consisting of desktop or portable PCs, terminals, personal digital assistants (PDAs), arcade consoles, cellular or Internet-based communication devices (phones), and the like.

11. The method to implement a business model for advertising revenue of claim 10, wherein the Internet-connected or Internet-connectable devices are capable of synchronizing transaction data with intermediary devices that can connect to the Internet, wherein the synchronization utilizes wired connections or wireless connections in order to exchange transaction data.

12. The system to implement a business model for advertising revenue of claim 1, wherein said designated locations refer to actual products, places providing products or services, points of display of information about such products or services, or simply locations that advertisers are interested in having audience members visit.

13. The system to implement a business model for advertising revenue of claim 1, wherein the RFID readers are implemented in portable devices selected from cellular phones, PDAs, and combinations thereof carried by responding audience members.

14. The system to implement a business model for advertising revenue of claim 13, wherein the RFID readers implemented in portable devices are capable of utilizing the power source, display, memory, processor, software, or operating system of the portable devices in order to reduce the required elements and cost of the RFID readers.

15. The system to implement a business model for advertising revenue of claim 1, wherein transactions are automatically initiated by the identifiers, detectors, or audience member initiated by an audience member pressing a button.

16. The system to implement a business model for advertising revenue of claim 15, wherein advertising hosts generate revenue by charging advertisers based on the number of completed transactions involving registered audience members coming into close proximity of designated locations and being detected by detectors.

17. The system to implement a business model for advertising revenue of claim 1, wherein the system can be operated by advertising hosts to provide compensation to responding audience members, such that real-world responses to advertisements by responding audience members who come into close proximity with designated locations are capable of acquiring value.

18. The system to implement a business model for advertising revenue of claim 17, wherein said compensation can have monetary value, redemptive value for prizes or services, or virtual value in the context of the electronic environment.

19. The system to implement a business model for advertising revenue of claim 18, wherein the electronic environment further comprises a Virtual Electronic Exchange System (VEES) to enable audience members to exchange received compensation with other audience members.

20. The system to implement a business model for advertising revenue of claim 1, wherein the electronic environment is a game, a community of interacting participants, an information providing service, or a data dissemination service.

21. The system to implement a business model for advertising revenue of claim 1, wherein the data communications network comprises the Internet and Internet-connected or Internet-connectable devices selected from the groups consisting of desktop or portable PCs, terminals, personal digital assistants (PDAs), arcade consoles, cellular or Internet-based communication devices (phones), and the like.

22. The system to implement a business model for advertising revenue of claim 21, wherein the Internet-connected or Internet-connectable devices are capable of synchronizing transaction data with intermediary devices that can connect to the Internet, wherein the synchronization utilizes wired connections, or wireless connections, in order to exchange transaction data.

* * * * *